Patented June 26, 1945

2,378,927

UNITED STATES PATENT OFFICE 2,378,927

SILICATE CEMENT, PARTICULARLY USEFUL AS A COATING

Clifford L. Jewett, Minneapolis, Minn., assignor to Minnesota Mining & Manufacturing Company, St. Paul, Minn., a corporation of Delaware No Drawing. Original application October 4, 1938, Serial No. 233,293. Divided and this application September 13, 1941, Serial No. 410,761

5 Claims. (Cl. 106—74)

This application is a division of my copending application Serial No. 233,293, filed October 4, 1938, as a continuation-in-part of my application Serial No. 749,481, which latter was filed October 22, 1934, as a continuation-in-part of my earlier application Serial No. 700,632, filed December 1, 1933. It relates in general to comminuted or granular material, of a mineral, siliceous or like nature, and more particularly to an improved process for treating such granular material and to the resultant product. My invention especially concerns the production of such a granulated mineral material or the like, having a water-resistant color-bearing coating suitable for embodiment in roofing material or the like, and while the invention is described as a colored granule and process for making the same to be incorporated in roofing materials such as shingles and the like to weather-proof or beautify the same, or for other purposes, it will be understood that the invention finds a wide field of utility.

While the invention is illustrated largely in connection with the roofing granule art, this particular application is especially concerned per se with the cementitious composition (which may be used to coat roofing granules).

The product of this invention may be incorporated as a coating for a roofing shingle or as an aggregate for incorporation in artificial stone such as cast stone, cement and the like, and for the base granule I may employ substances of a mineral, siliceous or like nature, whether natural or artificial, such, for example, as slags, feldspar, slate, quartz, quartzite, novaculite, igneous rocks and, in fact, practically any of the minerals which may be found in the ordinary gravel pit, as natural mineral substances, or I may employ crushed brick and other baked clay and similar material, porcelain, terra cotta or other ceramic wastes or cement compositions.

In the prior art relating to this subject, particularly where a ceramic coating is applied to the mineral base granule under the application of high temperatures to produce a glaze thereon, it is necessary to employ care in selecting a base granule which must be refractory and free from impurities which tend to discolor the glaze.

I am enabled to employ a relatively inexpensive base granule, and the ordinary impurities found in mineral materials such as iron and manganese have no effect on the resulting color obtained in the coating, and thus practically any gravel pit may yield a granule suitable for coating according to the process of my invention.

The coated granule, according to this invention, may be incorporated as a weather-resisting coating in a sheet coated with a bituminous or other adhesive, e. g. for forming roofing material either in rolls or in shingles, or the base granule coated according to this invention may be incorporated in cast stone and the like.

Heretofore, efforts have been made to treat crushed mineral material with a color bound to the granule with an organic bond, but this is unsuited for many purposes, inasmuch as the colors are only indifferently permanent, and the organic bond does not have the life or ageing characteristics necessary, particularly where it is desired to employ the granules in cast stone and the like.

As an alternative, inorganic bonds have been experimented with, and chief among those known to me are the type employing sodium silicate as a dried or dehydrated film or those in which certain combinations of sodium silicate and glaze-forming materials have been employed at relatively high temperatures to produce a fused coating or glaze on the surfaces of the granules. Others, except to a very limited extent in the production of fused coating or glazes, have never recognized, so far as I am aware, the advantages of employing aluminum bearing compounds, such as kaolin or sodium aluminate in the coating of granules. Advantages of using fluorides, such as cryolite, etc., in coating compositions were apparently never recognized prior to this invention, whether in connection with unfused coatings or vitrified or fused coatings.

In various of these methods, as distinguished from the present invention, the colors or pigments are dispersed in a sodium silicate solution, the granules being coated with this mixture and then dehydrated sufficiently to bind the color and the silicate to the granule. Chief among the defects of these methods and the resulting products or articles which limit their possible use are the lack of strength of color or proper tone of color, or tendency to blooming, lack of permanence of color and the limit of the range of colors available to be produced.

In the prior art known to me employing silicates, the temperatures disclosed in such prior art are either insufficient to produce an insoluble coating composition on the granules, or are extended to such a degree as to produce fusion, and, furthermore, the relationship between the silicates and other ingredients disclosed in the prior art are insufficient to provide a cement which is insoluble and weather resisting.

The principal objects and advantages of this invention reside in the provision of an improved article of manufacture, coated colored granules, which may be manufactured with a wide range of colors of extreme permanence and at a reasonable cost; the provision of treated granules of the character referred to in which a good bonding action can be attained between the base granule and the color-bearing coating; the provision of an improved granulated material suitable for use when exposed to the weather, in which desired color effects may be attained and in which steps of carrying out the process of manufacturing the same are reduced so as to reduce the cost of manufacture.

This invention also contemplates an improved method of applying a color-bearing coating to mineral granules, which does not necessarily require, and, in fact, preferably avoids the employment of the extremely high temperatures usually found necessary in producing glazed coatings; the provision of an improved process in which the reaction products of a silicate and a material containing an oxide or compound of aluminum, or its equivalent, such, for example, as a clay, are employed for incorporation in a coating to be applied to a mineral granule; the provision of an improved process and resulting article in which the silicates such as sodium silicate and metallic oxide containing components such as clays, kaolin, or aluminiferous materials, such as aluminum silicate, sodium aluminum silicate, and the like, may be reacted together with a pigment to form a color-bearing cement-like coating on the individual granules; the provision of an improved article of manufacture having a color-bearing coating on the individual granules thereof including the heat reacted product of a silicate and a clay; the provision of an improved granulated material having a color-bearing coating wherein the coating is rendered insoluble by the production of a heat reaction product of sodium silicate and clay, or sodium silicate and cryolite, or mixtures of sodium silicate, clay and cryolite, including a pigment; the provision of an improved method and article of manufacture forming a color-bearing coating for the individual surfaces of granular material wherein I provide a heat-reacted product of a silicate, a chromate and clay; the provision of an improved process for the production of granulated material having the individual granules provided with a weather-resisting and insoluble color-bearing coating wherein an improved step of treating the coating is employed for dehydrating and insolubilizing the coating for its entire depth, but, at the same time, preferably avoiding fusion of the coating mixture and thus avoiding deleterious effects on the coating.

The present invention has, as further objects, the provision of an improved granulated mineral material having a colored coating which is permanent in its adherence to the granule; a coating material which has the property of desired fluidity by virtue of the process employed in the course of its application to the granule and which coating material, therefore, readily spreads on the base granule, assisting in attaining the desired permanence of adherence to the granule, and at the same time possesses suitable coefficients of expansion and contraction so that the color coating may be successfully applied on a wide range of different materials forming the base granule.

For the purpose of my invention, I have employed quartzite granules, due particularly to their ready availability to me, but it will be understood that, by keeping the temperatures within limits hereinafter pointed out, other granules may be employed for the purpose, such, for example, as common gravel, slate, dolomite, marble, gannister, etc., as well as crushed porcelain and the like.

The present invention in one of its forms employs as a coating composition an inorganic heat reaction product of a silicate, conveniently sodium silicate, and a clay, such, for example, as kaolin, bentonite, and the like, and the particular ingredients which I have employed as hereinafter pointed out are, when treated according to my process, substantially insoluble in water or under various changes in weather conditions, it being one of the aims of the invention to produce a coating containing a silicate and a clay wherein a substantial dehydration of the mixture takes place without, however, fusion thereof, so that care need not be exercised in the selection of the base granule.

Thus the coating of my invention may be conveniently termed a high temperature cement, and where this expression is employed herein and in the claims I mean to include materials or combinations of materials which are heat reacted to an extent above dehydration temperature of the materials but below the temperature at which the combination of materials fuses.

As herein pointed out, the mineral base granule may be of any materials which will withstand temperatures of the degree necessary to produce the reaction between the silicate and clay without disintegration of the granule, and a suitable pigment to be employed for imparting color to the coating should also be capable of withstanding the temperature necessary to produce the final coating.

The bond in one of its forms in holding the pigment in the coating to the granule is substantially a high temperature cement produced by the reaction of sodium silicate and a clay, such as kaolin, or in other of its forms may employ equivalent materials such as sodium silicate with feldspar or cryolite, or where sodium silicate is replaced partially with sodium aluminate and used with feldspar or clay, or the like, at temperatures which, for my purposes, I have found to range above about 450° C. (i. e. above approximately 850° F.). In my production of the coating, reaction is produced between the sodium silicate and clay which is substantially a dehydration of both, with a subsequent sintering together of the two into a hard, strong and non-porous insoluble and weather-resisting cement containing a coloring compound.

I have found in one of the forms of my invention that the ingredients of the color-bearing coating may be combined in the following proportions:

Granulated mineral (quartzite, etc.) to the extent of 500 grams moistened with 10 cubic centimeters of a sodium silicate solution. This sodium silicate solution should be of a specific gravity of 1.30, and the sodium silicate may be according to the formula Na$_2$O—3.25 SiO$_2$. I have obtained excellent results with a sodium silicate of this character.

To this mixture of sodium silicate and mineral I then add five grams of kaolin which is a well-known clay and appears to give excellent results in its reaction with the sodium silicate. To this is added four grams of pure red iron oxide, and the mix is then agitated until the granules are completely coated. I have found that red iron oxide performs the dual function of lending color and reacting with the sodium silicate for insolubilizing the same.

The above formula may be presented in table form, as follows:

*Formula 1*

|  | Pounds |
|---|---|
| Granules (quartzite, etc.) | 2,000 |
| Kaolin | 20 |
| Red iron oxide | 16 |
| Sodium silicate solutions of specific gravity 1.3 | 52 |

Additional water if desired to facilitate mixing.

By preliminarily wetting or moistening the granules with the aqueous solution of sodium silicate they are made more receptive of the coating composed of the clay and color pigment such as red iron oxide or chrome oxide or the like.

The granules thus coated are then dried and heated subject to a temperature of from 450° to 750° C. (850 to 1400° F.) or higher. Under the application of heat in controlled amount, a reaction between the sodium silicate and clay results to form an insoluble and weather-resisting coating on the individual granules which permanently retains the pigment so that a color-bearing coating is thus produced.

I have found that excellent results are obtained at temperatures even above 1400° F., as long as the maximum temperature employed is kept controlled below the fusing temperature of the mixture, which fusing temperatures in many cases lie in the range from 1600° F. to 2000° F. depending upon the materials which are brought together in the reaction.

Thus, my invention, in one of its aspects, may be said to give its best results and produce a color-bearing coating of best quality by the employment of much higher temperatures for reaction purposes than have heretofore been employed for setting cementitious combinations. For example, it is well known in the prior art to employ temperatures ranging from 900° F. to as high as 1800° F. for the purpose of producing a fuzed glaze, depending, of course, on the fusing temperatures of the materials employed. It is not, however, known to me in prior art to produce a hard weather-resisting heat solidified cement with temperatures within the range beginning at or above the dehydration temperatures of the ingredients of the mixture, but controlled below the fusing temperature of the particular mixture employed, which is one of the novel features of my invention.

It will be understood, therefore, that I have chosen that range of temperatures in which important reactions and combinations take place without fusion, although the present invention in certain of its aspects, also comprehends fusion or sintering.

Formulae which have served to produce highly efficient and attractive color-bearing coatings employing several different forms of ingredients, in all of which I employ an ingredient containing a metallic oxide or its equivalent, may be exemplified below.

A formula employing feldspar (an alumino-silicate of K, Na, etc.) and sodium silicate is as follows:

*Formula 2*

|  | Pounds |
|---|---|
| Quartz | 2,000 |
| Feldspar (powdered) | 40 |
| Red iron oxide | 28 |
| Sodium silicate solution (sp. grav. 1.3) | 52 |
| Additional water | 20 |

Likewise a formula employing cryolite may be as follows:

*Formula 3*

|  | Pounds |
|---|---|
| Quartz | 2,000 |
| Cryolite (sodium aluminum fluoride, powdered) | 20 |
| Red iron oxide | 28 |
| Sodium silicate solution (of spec. grav. 1.3) | 52 |
| Additional water | 20 |

An alternative of Formula #1 above may be as follows:

*Formula 4*

|  | Pounds |
|---|---|
| Quartz | 2,000 |
| Feldspar (powdered) | 40 |
| Iron oxide | 16 |
| Sodium aluminate | 14.4 |

I have obtained successful results with koalin and sodium dichromate in the following proportions:

*Formula 5*

|  | Pounds |
|---|---|
| Quartz | 2,000 |
| Koalin | 20 |
| Sodium dichromate (affords color and cement) | 28 |
| Water | 40 |

From the foregoing formulae it will be observed that the ingredients feldspar (an alumino-silicate of Na, K, Ca, etc.), cryolite (Na$_3$AlF$_6$), kaolin, etc., all contain metal oxides or compounds of similar metals, e. g. of aluminum. Cryolite, which is a sodium aluminum fluoroide, may be viewed, to some extent, as a substitute for certain aluminuates in the final coating of the particles or granules in that a metal oxide radical is replaced by a metal fluoride radical. However, this analogy is only partial and it should be observed that cryolite has some properties, e. g. for use with kaolin and/or sodium silicate as illustrated above, which cannot ordinarily be supplied by aluminates, for example. In this respect the fluorine appears to be an important element. The following, which may be viewed as a composite of Formulae 1 and 3 above, amplifies the above illustrations of the advantages in a coating composition of a compound of fluorine such as cryolite.

*Formula 6*

|  | Pounds |
|---|---|
| Granules (siliceous granules, such as greystone, etc.) | 2,000 |
| Ultramarine blue (pigment) | 26 |
| Kaolin | 16 |
| Cryolite | 4 |
| Sodium silicate solution | 72 |
| Water | 4 |

The sodium silicate solution of Formula 6 had a specific gravity of 1.4 and a ratio of Na₂O to SiO₂ of 1 to 3.22. That is, the solution had a solids content a little below 40 percent.

The water in the above formula is for the purpose of facilitating the mixing of the granules and coating composition and may accordingly be varied as desired.

After mixing the above formula to completely coat the granules with the coating materials, the same is then fed into a rotary kiln, for example, where it is dried and then brought up to a temperature of about 1050° F., which is sufficient to induce the desired solid phase reaction and coating. At this temperature fusion of the coating materials is not effected. Where it is desired to employ this coating in a fused state, as may be desired where certain reaction products of zinc compounds and iron salts, or of iron compounds and chrominum compounds, chrome oxide, etc., are employed as pigments, higher temperatures such as, for example, 1500° or 1600° F., or the like, must be employed and the proportions of the ingredients may be varied somewhat, if desired, though this is not essential.

In fact that Formula 6 can be heat reacted at about 1050° F., or even somewhat lower, is an important factor in manufacture in that this lower temperature is more economical from a heat standpoint and also lessens the insulation problem and makes working conditions more pleasant. Further, where certain pigments are employed, such as the ordinary commercial ultramarine which is more largely sold at the present time, it is advantageous (and sometimes almost imperative if these materials are to be employed) to avoid relatively high temperatures. Commercial ultramarine blues, while they give very satisfactory results in my process, e.g. at temperatures of the order of 1050° F., I have found that they lose their color strength rapidly when heated much above about 1200° F. and preferably should be kept below the latter temperatures.

A still further alternative formula employing the ingredients in the foregoing Formula 5 may be as follows:

Formula 7

|  | Pounds |
|---|---|
| Granules (quartz, etc.) | 2,000 |
| Kaolin | 60 |
| Sodium dichromate | 40 |
| Water | 40 |

The mixture of the formula may be fired at a temperature of about 1500° to 1850° F. (approximately 850 to 1000° C.), preferably in a reducing atmosphere. This treatment causes the sodium dichromate to break down and form chrome oxide and soda, the kaolin being dehydrated. Thereupon the soda reacts with the quartz granules and the dehydrated kaolin to form a hard, waterproof and weather-resisting cement containing chrome oxide as a pigment. The mixture, where fired below 1000° C., does not become fused, and, therefore, does not form a glaze.

In the form of one ton of coated granules I prefer to employ about 60 lbs. of kaolin per ton, and the coating produced may be likened to a colored clay slip or engobe which, upon being fired below a glazing temperature produces a pitted film on the relatively non-porous base granule. Where such a film is made relatively thin it may be porous, in part at least, but in any event leaves a rough external surface which facilitates the retention of the granular material in a roofing sheet.

This form of coating possesses distinct advantages in that it aids the adhesion of the granule to an asphalt base roofing material. The base granule being relatively non-absorptive, and the coating being pitted, or, for some purposes, even porous, provide a composite which is non-blistering and non-staining. Blistering may be caused in asphalt roofing or the like by virtue of the absorption of water in porous granules and the subsequent vaporization of this water by the sun's heat, thus producing a blistering of the asphalt. Staining of shingles made by prior methods employing porous granules is apparently caused by the absorption of the light oils from the asphalt into the capillaries of the porous granules, with resultant discoloration of the shingles.

This form of the invention does not possess these defects, inasmuch as the non-porous granule prevents moisture entering the capillaries of the granule, and yet the pitted or porous coating provides the desired roughness on the external surface which facilitates retention of the coated granules in a bituminous or asphalt coated shingle.

Formula 6, Formula 1 and Formula 3 represent coating compositions of great importance and, of these, a composition as illustrated by Formula 6 is outstanding. However, though generally less advantageous than those just mentioned, the following formulae have utility and may be employed.

Formula 8

|  | Pounds |
|---|---|
| Granules (quartzite, slate, etc.) | 2,000 |
| Kaolin | 40 |
| Red iron oxide (pigment) | 20 |
| Sodium aluminate | 14 |
| Water | 40 |

Formula 9

|  | Pounds |
|---|---|
| Granules (quartzite, igneous rock, etc.) | 2,000 |
| Kaolin | 40 |
| Sodium silicate (powdered) | 40 |
| Red iron oxide | 20 |
| Sodium aluminate | 14 |
| Water | 40 |

Formula 10

|  | Pounds |
|---|---|
| Granules | 2,000 |
| Cryolite | 40 |
| Kaolin | 40 |
| Red iron oxide | 20 |
| Water | 40 |

Formula 11

|  | Pounds |
|---|---|
| Granules | 2,000 |
| Feldspar | 40 |
| Red iron oxide | 16 |
| Sodium aluminate | 14.4 |
| Water | 40 |

Formula 12

|  | Pounds |
|---|---|
| Granules | 2,000 |
| Feldspar | 40 |
| Solid, powdered sodium silicate | 40 |
| Red iron oxide | 20 |
| Sodium aluminate | 14 |
| Water | 40 |

In a coating operation employing any of Formulae 8, 9, 10 or 11, temperatures of the order of 1800° F. may advantageously be used where a solid phase type of reaction of the coating ingredients is desired (i. e. absence of fusion).

Where a pigment other than $Fe_2O_3$ is employed, which can stand high temperatures, and/or where a fused or sintered coating is desired, higher temperatures will be employed. Where Formula 12 is used, coating may be effected at temperatures of the order of 1500° F., or higher where incipient fusion or actual fusion of the coating ingredients of Formula 12 is desired. Incipient fusion will begin at about 1600° to 1650° F.

Formula 8 illustrates a kaolin-sodium aluminate type of coating composition while Formula 9 illustrates a kaolin-sodium aluminate-sodium silicate type of coating material, the latter being preferred over the former. Formula 10 shows kaolin and cryolite in admixture.

Formula 11 shows feldspar and sodium aluminate in admixture, while Formula 12 shows sodium silicate in admixture with these two ingedients or reactants.

It will also be understood that the sodium silicate, sodium aluminate and sodium dichromate ingredients specified herein may be characterized as of a group of alkali-bearing components and serve to be reacted upon by the metallic oxide containing ingredients to produce an insoluble coating.

It will be understood, of course, that, while I having specified a sodium silicate of a certain specific gravity and have also specified one example of the proportions of sodium silicate to kaolin, and to pigment, this formula is subject to variation to suit different conditions and to attain different tones of coloring desired.

It is to be understood that the temperature range is also subject to variation as desired but that care should be taken, in producing the reaction by heat between the clay and sodium silicate, that an actual fusion of the mixture forming the coating is not produced, as the avoidance of fusion prevents impurities in the base granule from being released, which would cause their entrance into the coating and resultant effect on the color tone produced.

The granules mentioned in the above formula may be considered to be of such size that they will pass a "10-mesh" screen but be retained on a "35-mesh" screen. However, smaller or larger granules may be employed, but, for similar results, the amounts of the coating ingredients should be varied with variations in the surface area of each ton or unit weight of granules.

As distinguished from prior art known to me, my invention produces an insoluble and weather-resisting coating which is of an insoluble and weather-resisting character throughout its entire depth, whereas in the prior art known to me there is produced merely a skin effect, and the coatings of the prior art are not possessed of the character of insolubility throughout their entire depth.

Apparently in my process, dehydration of the mixtures including sodium silicate, sodium aluminate and/or sodium dichromate takes place short of actual fusion of said mixtures and, at the same time, one or more of these materials react with the kaolin-like material or feldspar, as the case may be, by combination, to form an insoluble sodium aluminum silicate which is a distinct chemical reaction as produced according to my invention and not to be found in the prior art known to me.

The product of a metallic oxide-containing component and an alkali-bearing component, for example, kaolin and sodium silicate or feldspar and sodium aluminate as disclosed by me, may be of variable composition, the insolubility or re-resistance to weather being a function of this composition.

In some instances where this invention is employed as a coating for granulated slate, it may be desirable to make certain changes in the proportions, inasmuch as slate itself contains some clay, but the amount of clay contained in slate is not sufficient to react with the sodium silicate or sodium aluminate to render the same insoluble for coating individual granules. On the other hand, I have found that the small amount of argillaceous dust present with slate is in no way detrimental to the coating as applied according to my invention.

For use with a slate, dolomite or marble granule I have successfully employed the ingredients and their proportions as follows:

*Formula 13*

| | Pounds |
|---|---|
| Slate | 2,000 |
| Kaolin | 20 |
| Red iron oxide | 16 |
| Sodium silicate solution sp. g. 13 | 52 |

The above formula is similar to Formula 1 above except for the base granule here specifically illustrated. Where translucent granules, such as quartz, etc., are employed, the quantity of pigment may often advantageously be increased somewhat, as, for example, to about 28 lbs. per ton of granules.

It will be understood that in the case of slate the formula last mentioned above may be varied as desired, depending upon the porosity of the slate.

Dolomite and marble are suitable for my purposes, it being understood, however, that if these base granules are employed they must be of a character which will withstand the temperatures necessary for roasting. I have found that alkaline earth carbonates do not, by themselves, render sodium silicate sufficiently insoluble to be used as a coating. In the case of base granules such as quartzite, kaolin, or its equivalent, is found to be particularly advantageous in order to obtain a permanent and insoluble color-bearing coating.

From the foregoing it will be observed that my improved process may involve the following illustrative steps:

(1) Wetting the quartz granules with an aqueous solution of an alkali-bearing material such as sodium silicate, sodium aluminate or sodium dichromate;

(2) Adding a metallic oxide-bearing component, such as clay or its equivalent and/or cryolite, and a pigment in desired proportions thereto; and (3) Then applying heat at least above the dehydration temperature of the coating mixture, usually above 850° F., but regulating the degree of heat below the fusing point of the coating mixture, preferably below 1450 F.°, so as to produce a reaction between the sodium silicate and clay or sodium aluminate and feldspar to produce substantially a sodium aluminum silicate. By this reaction the entire coating of each granule throughout the depth of the coating is rendered waterproof, insoluble and weather-resisting.

In the case of the employment of sodium dichromate as the alkali containing component, it may be desirable to go to higher temperature limits to produce the required reaction and render the coating insoluble. The temperature may be kept below the fusion point of the mixture, especially where, for example, kaolin or the like is used in relatively high proportion; or temperatures above the fusion point of the coating may be employed where relatively small amounts of kaolin or the like are used.

I have also discovered that I am enabled to obtain satisfactory results by employing a combination of sodium chromate and sodium silicate together with clay. Heretofore difficulty has been encountered in incorporating sodium dichromate and sodium silicate in the same glaze coating, inasmuch as sodium dichromate and sodium silicate, when introduced into the same mixture, react so that the sodium dichromate, giving an acid reaction, gels the sodium silicate I overcome this difficulty by employing sodium chromate which readily mixes with sodium silicate without gelling the silicate. I have found that a formula incorporating these ingredients in the proportions by weight for coating approximately one ton of granules may be as follows:

Formula 14

| | Pounds |
|---|---|
| Quartz | 2,000 |
| Kaolin | 60 |
| Sodium chromate | 40 |
| Sodium silicate solution | 30 |
| Water | 40 |

The advantages of employing the sodium silicate in the last formula appearing above is that the combining or cementing of the clay and the sodium chromate to the base granule during the initial drying and firing process is increased and, for some purposes, gives better ultimate results in the color-bearing coating than in that employing a sodium dichromate and clay alone.

By way of recapitulation, in employing coating compositions in which sodium silicate and kaolin are solely the essential reactants, and are present in such proportions as are illustrated hereinabove by Formula 1, for example, it is desired to avoid fusion of the coating ingredients during the coating process, both in the interest of simplifying the coating process and also in the interest of producing satisfactory granules at low cost.

While hereinabove my invention has been illustrated by various formulae and other illustrations, and further while my invention has been illustrated to a great extent in connection with granules having a coating of the unfused, solid phase reaction type, it will be understood that this invention is not to be limited by such illustrations. In fact it has been pointed out that coating compositions as shown in certain of the formulae, such as Formulae 4, 8, 9, 10 and 11, may be advantageously applied as vitrified or fused coatings. Also while it has been pointed out that cheap granular material, containing impurities may be employed as base granules, particularly where coatings are applied below temperatures of fusion or incipient fusion, it will be understood that my invention also comprehends the use and the coating of translucent granules such as quartzite. Where such granules are coated with compositions as illustrated by formulae above, e. g. Formula 1, the same will then provide improved adherence to photosensitive adhesives such as asphalt over extended periods of time.

It will be evident that the present invention as defined in the appended claims covers roofing materials or the like in which reaction products of admixtures, such as illustrated by the above formulae, are used, whether the reaction product is employed with or without base granules, it being broadly contemplated that such reaction products may be embedded, as such, e. g. in comminuted form, in an adhesive binder such as asphalt or tar-like materials, where desired; or such reaction products may be employed as a continuous or interrupted coating on articles other than granules, e. g. larger articles, to beautify or weather-proof the same, or to serve other desired purposes.

All modifications and variations of this invention within the scope of the appended claims are contemplated.

While kaolin has been hereinabove employed as a prime example of blends of silica and alumina (in chemical composition) or argillaceous materials for use in coating compositions, it will be understood that other blends of silica and alumina, such as pyrophyllite, kyanite and/or even feldspar may be employed in place of some of the kaolin or may replace the kaolin entirely. Other alumino-silicates, such as fuller's earth, may also be employed.

Thus in the above formulae, e. g. in Formula 6, kaolin may be replaced in whole or in part with pyrophyllite, for example, and the cryolite may be replaced in whole or in part by sodium silico-fluoride or the like. While the sodium silicate of this coating composition (e. g. Formula 6) may be replaced in part, if not entirely, by other silicates, it is generally preferred to employ inorganic silicates and especially alkali metal silicates. Of the alkali metal silicates, sodium silicate is the most practical and also possesses particular advantages, especially where temperatures below fusion are employed in the coating operation, inter alia, in providing a good continuous and dense coating.

Another important characteristic of cryolite ($Na_3AlF_6$), and of such substitutes as sodium silico-fluoride, is that the cryolite is insoluble in water. If the cryolite were soluble in water (which it is not), it would react with the sodium silicate and precipitate it and thus the adhesive effect of the sodium silicate in the coating composition would be lost. The cryolite, being insoluble in water, allows the sodium silicate to provide its adhesive and coating functions and then (after the water has been driven from the coating ingredients which are distributed over surfaces of the granules and the granules are further heated) the coating ingredients react with each other, the cryolite (because of its acid radical) serving to neutralize the alkalinity of the sodium silicate and thus render the final coating more insoluble and weather-resistant. There are indications that the cryolite or equivalent may also serve to some extent as a catalyst to foster this desired reaction between the kaolin or equivalent and sodium silicate.

What I claim is:

1. As a new article of manufacture, a dense lithic base granule coated by producing in situ thereon the unfused, solid phase heat-reaction product of an aqueous solution of sodium silicate of concentration approximately thirty to thirty-eight percent and an admixed solid fluoride, said fluoride being a ternary compound of fluorine, an alkali metal and a polyvalent metal, the said sodium silicate containing at least one molecular proportion of sodium oxide to 3.25 molecular proportions of silicon dioxide and the said fluoride being present in at least the amount adequate theoretically to neutralize the silicate, said heat reaction product being produced at elevated temperatures substantially in excess of atmospheric and room temperatures but below those temperatures which would produce fusion and said heat reaction product having a coloring agent therein.

2. As a new article of manufacture, a dense lithic base coated by producing in situ thereon the unfused, solid phase heat-reaction product of an aqueous solution of sodium silicate of concentration approximately thirty to thirty-eight percent and an admixed solid fluoride, said fluoride being a water-insoluble fluoride of an alkali metal and a polyvalent metal, the said sodium silicate having a ratio between the sodium oxide and silicon dioxide of between 1:3.25 and 1:2, and the said fluoride being present in at least the amount adequate theoretically to neutralize the silicate, said heat-reaction product being produced at elevated temperatures substantially in excess of atmospheric and room temperatures but below those temperatures which would produce fusion.

3. The unfused, solid phase heat-reaction product of a preformed aqueous solution of sodium silicate of concentration approximately thirty to thirty-eight percent and an admixed solid fluoride, said fluoride being a ternary compound of fluorine, an alkali metal and a polyvalent metal, the said sodium silicate containing at least one molecular proportion of sodium oxide to 3.25 molecular proportions of silicon dioxide and the said fluoride being present in at least the amount adequate theoretically to neutralize the silicate, said heat reaction product being produced at elevated temperatures substantially in excess of atmospheric and room temperatures but below those temperatures which would produce fusion.

4. The unfused, solid phase heat-reaction product of a preformed aqueous solution of sodium silicate of concentration approximately thirty to thirty-eight percent and an admixed solid fluoride, said fluoride being a water-insoluble fluoride of an alkali metal and a polyvalent metal, the said sodium silicate having a ratio between the sodium oxide and silicon dioxide of between 1:3.25 and 1:2, and the said fluoride being present in at least the amount adequate theoretically to neutralize the silicate, said heat-reaction product being produced at elevated temperatures substantially in excess of atmospheric and room temperatures but below those temperatures which would produce fusion.

5. A silicate cement comprising a preformed aqueous solution of sodium silicate of concentration approximately from thirty to thirty-eight percent and admixed solid fluoride, said fluoride consisting substantially of sodium aluminofluoride (cryolite), the silicate containing at least one molecular proportion of sodium oxide to 3.25 molecular proportions of silicon dioxide and the fluoride being present in at least the amount adequate theoretically to neutralize the silicate and yield a reaction product substantially free of water-soluble salts of sodium.

CLIFFORD L. JEWETT.

CERTIFICATE OF CORRECTION.

Patent No. 2,378,927.  June 26, 1945.

CLIFFORD L. JEWETT.

It is hereby certified that error appears in the printed specification of the above numbered patent requiring correction as follows: Page 2, second column, lines 24 and 56, for "kaloin" read --kaolin--; page 3, first column, lines 34 and 35, for "750° C. (850 to 1400° F.) or higher. Under the heated subject to a temperature of from 450° to" read --heated subject to a temperature of from 450° to 750° C. (850 to 1400° F.) or higher. Under the--; line 58, for "fuzed" read --fused--; and second column, line 42, for "Koalin" read --Kaolin--; page 4, second column, line 74, for "reacttion" read --reaction--; page 5, first column, line 18-19, for "ingedients" read --ingredients--; line 28, for "having" read --have--; and second column, line 25, for "sp. g. 13" read --sp. g. 1.3--; page 6, first column, line 16, after the word "silicate" insert a period; line 43, after "example" strike out the period and insert instead a comma; and that the said Letters Patent should be read with this correction therein that the same may conform to the record of the case in the Patent Office.

Signed and sealed this 20th day of November, A. D. 1945.

Leslie Frazer (Seal)  First Assistant Commissioner of Patents.